UNITED STATES PATENT OFFICE.

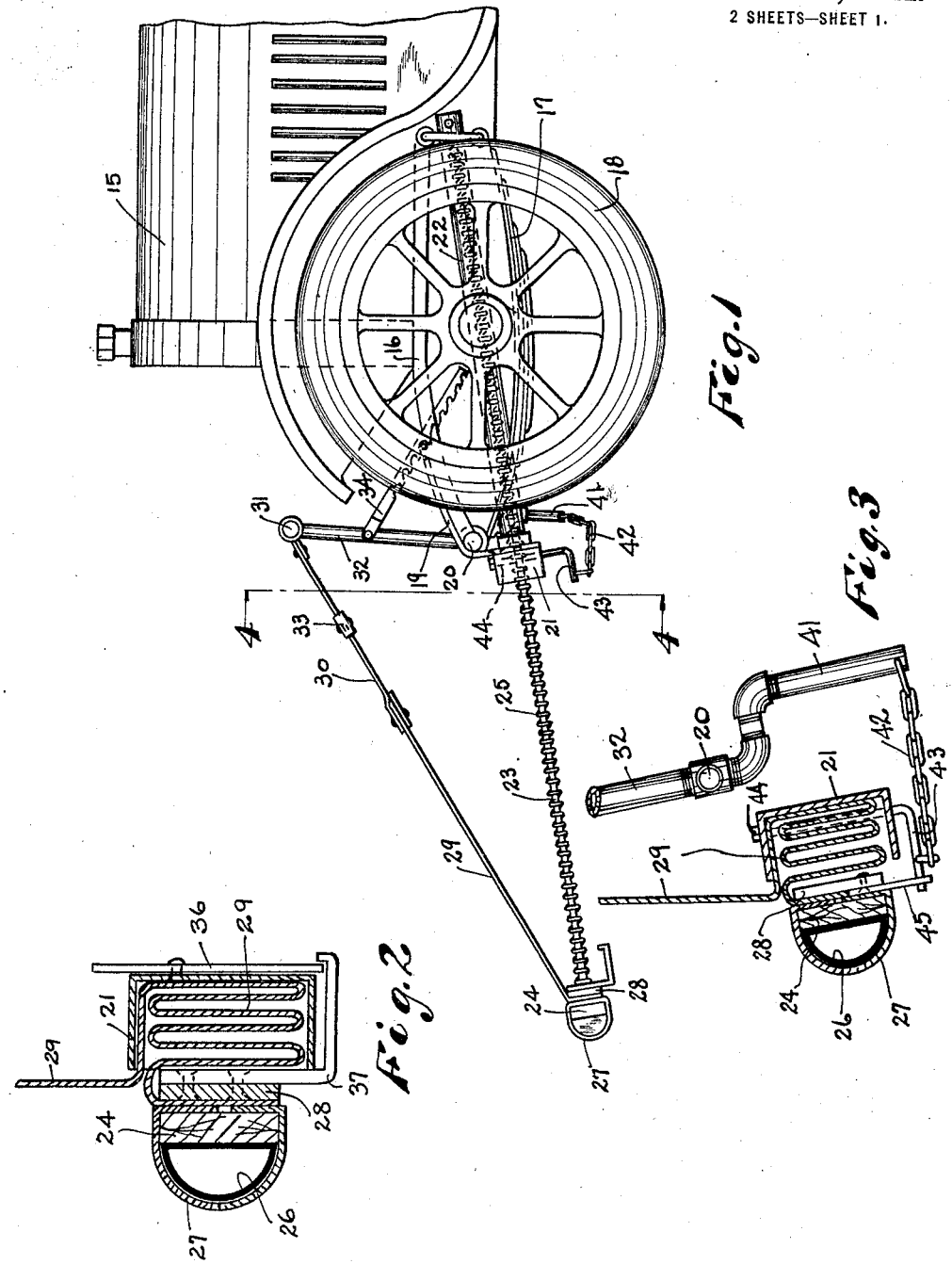

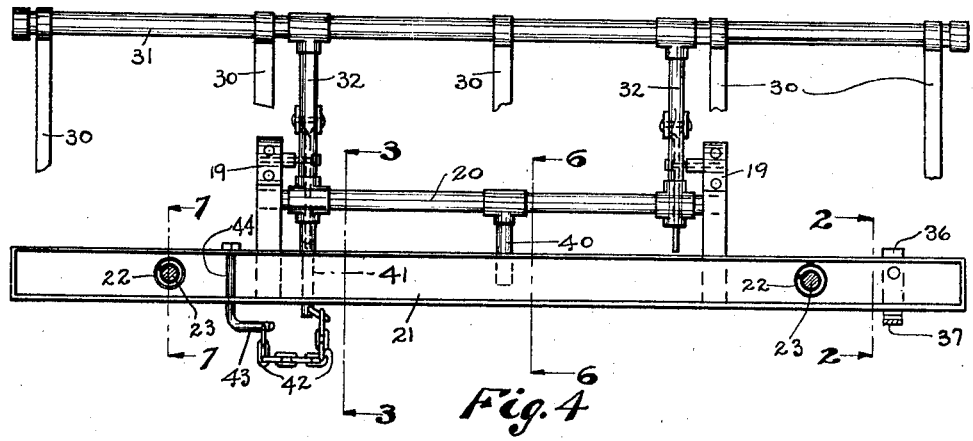

WILLIAM MEYER, OF CRYSTAL LAKE, ILLINOIS.

SAFETY DEVICE FOR AUTOMOBILES.

1,394,437.　　　　Specification of Letters Patent.　　Patented Oct. 18, 1921.

Application filed October 25, 1920. Serial No. 419,419.

*To all whom it may concern:*

Be it known that I, WILLIAM MEYER, a citizen of the United States, and a resident of Crystal Lake, in the county of McHenry and State of Illinois, have invented certain new and useful Improvements in Safety Devices for Automobiles, of which the following is a specification.

My invention relates to safety devices for automobiles and it has for its principal object the provision of a new and improved form and arrangement of parts by reason of the use of which with an automobile a person hit by the automobile will be saved from serious injury.

Other objects will appear hereinafter.

The invention consists in the combinations and arrangements of parts hereinafter described and claimed.

The invention will be best understood by reference to the accompanying drawings forming a part of this specification, and in which, Figure 1, is a side view of the front end portion of an automobile equipped with my safety device which is shown in extended position, Fig. 2, an enlarged detail view, being a section taken on line 2—2 of Fig. 4, Fig. 3, an enlarged detail view, being a section taken on line 3—3 of Fig. 4, Fig. 4, a front view of my improved device, partly in section and partly broken away, for clearness of illustration, Fig. 5, a front view of my improved device in extended position, Fig. 6, an enlarged detail view, being a section taken on line 6—6 of Fig. 4, Fig. 7, an enlarged detail view, being a vertical cross section taken on line 7—7 of Fig. 4, and Fig. 8, a detail view showing the means for holding the safety device against being drawn forward out of operative position.

Referring to the drawings, 15 indicates the front end portion of an automobile comprising the main frame 16 connected by means of the usual spring 17 with the supporting wheel 18. As is best shown in Fig. 1, the side bars of the frame 16 are provided with brackets 19 at their forward ends serving as supports for a rock shaft 20, as is best shown in Fig. 4. The lower ends of the brackets 19 are also fixedly connected with a transversely extending bar 21 in the form of a channel, as is best shown in Fig. 2. At its opposite end portions the channel bar 21 is provided with rearwardly extending tubular bars 22 (see Fig. 7) within which are slidably mounted bars 23 which are connected at their forward ends by a transversely extending bumper bar 24. Coiled springs 25 are mounted upon the rods 23 within the tubular bars 22, such springs being adapted normally to hold the bumper bar 24 at the limit of its forward movement, as shown in Fig. 1, the rods 23 being adapted to move longitudinally within the tubular bars 22 under the influence of the springs 25, as will be readily understood.

Means is provided for holding the bumper bar 24 in its rearward position against the action of the springs 25, as hereinafter described, such means being adapted, at the proper moment, to release the bumper bar so as to be free to be projected forwardly by the springs 25. Cushioning means is accordingly mounted upon the front face of the bumper bar 24, such cushioning means, in the construction shown, comprising a pneumatic tube 26 held in position upon the front face of the bar 24 by a strip of canvas 27 which is wrapped about the tube 26 and the bar 24 and is secured at its edges in such position by means of a transversely extending plate 28, as is best shown in Fig. 2.

My safety device comprises an apron adapted to be held in position to receive and support the body of a person accidentally hit by the automobile. In the construction shown, this apron is in the form of a piece of canvas 29 which is secured at its forward edge between the transversely extending bar 24 and the plate 28, and is supported at its rear edge by means of straps 30 mounted upon a cross bar 31 which is supported by upwardly extending arms 32 from the transversely extending rock shaft 20. A brace bar 33 is provided connecting intermediate portions of the straps 30, as is best shown in Fig. 5. Means is provided comprising rack bars 34 pivotally mounted upon the arms 32, (see Fig. 1) in position to have engagement with pins 35 carried by the side bars of the frame 16, as is best shown in Fig. 8. The teeth of the rack bars 34 are so arranged (see Fig. 1) that the bars are adapted to slide rearwardly with respect to the pins 35, but are held from movement forwardly with respect thereto, except as the bars are raised out of contact with the pins. By the means above described, the apron 29 is supported firmly in position so as to support the body of a person being accidentally hit by the automobile, so as to prevent the automobile from running over the body.

When the apron 29 is being moved to its retracted position, as shown in Fig. 3, the fabric is folded up within the channel bar 21 as the bumper bar 24 is pushed backward against the action of the springs 25. When the bumper 24 reaches its rearmost position, as shown in Fig. 2, a turn button 36, carried by the bar 21, (see Fig. 2) is turned to engage the latch finger 37 carried by the plate 28, serving to hold the bumper bar releasably in its rearmost position.

Other means is provided adapted to be used alternatively for holding the bumper bar 24 releasably in its rearmost position, as shown in Fig. 2, with the apron 29 retracted. This means comprises an arm 38 (see Fig. 6) carried by the plate 28 of the bumper bar construction, the bar 38 having a latch device 39 pivotally mounted thereon in position to be turned up in engagement with the rear face of the channel bar 21. A downwardly extending bar 40, carried by the transverse bar 20, is adapted normally to engage the upper end of the latch 39 for holding the latch in operative position for preventing forward movement of the bumper bar 24, as is shown in solid lines in said Fig. 6. When the bar 40 is given a rotary swinging movement toward the left in Fig. 1, such bar is carried out of engagement with the latch 39 so as to permit the latch to drop to the position shown in dotted lines in said Fig. 6 for permitting the springs 25 to project the bumper bar 24 and the apron 29. Inasmuch as the bar 40 is mounted rigidly upon the cross-bar 20, which in turn is rigidly connected with the upwardly extending bars 32, it will be understood that a backward pressure upon the cross-bar 31 at any point will serve to release the latch 39 for permitting the projection of the apron.

With the bumper 24 held in retracted position, as shown in Fig. 6, and with the button 36 out of engagement with the finger 37, the device is in condition for operation. In case the automobile upon which the safety device is mounted is brought into contact with some part of the body of a person in the path of the machine, the backward pressure upon the bar 31 serves to release the latch 39, as above described, so as to permit the projection of the bumper bar 24. The springs 25 are of such a strength as to project the bar 24 with sufficient force to throw a man out of balance so as to cause his body to fall upon the apron 29 which is projected in time to catch the body and break the force of the fall. I have found, in practice, that my device is effective, as above described, and accordingly, I consider my construction as of very great importance.

Means is provided in connection with my device for exerting a forward pull upon the frame-work comprising the bars 20, 32 and 31 upon the forward movement of the bumper bar 24 for the purpose of releasing the moving parts if, by any possibility, they may have become distorted so as to fail to work smoothly. This means comprises a downwardly extending bar 41 fixedly connected with the cross-bar 20, as is clearly shown in Fig. 3. The lower end of the bar 41 is connected by means of a chain 42 with a horizontally swinging pin 43 which is pivotally mounted upon a vertical axis by means of its upwardly turned portion 44. A finger 45 extending downwardly from the plate 28 is normally held in position in rear of the laterally extending pin 43, such finger 45 being brought into contact with the pin 43 in the forward movement of the bar 24, serving to tighten the chain 42, as shown in Fig. 3, for exerting a sudden pull upon the lower end of the bar 41.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A device of the class described comprising a collapsible apron; springs tending to project said apron forwardly; an upwardly extending trigger serving to hold said apron releasably in collapsed condition; and a cross-bar carried by said trigger for releasing the trigger by backward pressure thereon, substantially as described.

2. A device of the class described comprising a laterally disposed bumper; springs tending to project said bumper forwardly; flexible fabric connected with said bumper and adapted to be projected forwardly therewith; and releasable means for holding said bumper in retracted position against the action of said springs, said means being adapted to automatically release said bumper upon contacting with an object, substantially as described.

3. A device of the class described, comprising a laterally disposed bumper mounted on the forward end of an automobile; springs tending to project said bumper forwardly; a cross-bar supported above said bumper; flexible fabric connected with said bumper and cross-bar and adapted to be projected forwardly therewith; and an exposed trigger for holding said bumper in retracted position against the action of said springs and adapted, upon backward movement, to release said bumper for projection by said springs, substantially as described.

4. A device of the class described comprising a laterally disposed bumper mounted on the forward end of an automobile; springs tending to project said bumper forwardly; a cross-bar supported above said bumper; flexible fabric connected with said bumper and said cross-bar, and adapted to be projected forwardly therewith; and releasable means for holding said bumper in retracted position against the action of said springs, said holding means being adapted to be released for permitting the projection of the bumper upon backward movement of said cross-bar, substantially as described.

5. A device of the class described comprising a laterally disposed bumper mounted on the forward end of an automobile; springs tending to project said bumper forwardly; a cross-bar supported above said bumper; means permitting backward movement of said cross-bar but adapted to prevent forward movement thereof; flexible fabric connected with said bumper and said cross-bar and adapted to be projected forwardly therewith; and releasable means for holding said bumper in retracted position against the action of said springs, said holding means being adapted to be released for permitting the projection of the bumper upon backward movement of said cross-bar, substantially as described.

6. A device of the class described comprising a laterally disposed bumper mounted on the forward end of an automobile; springs tending to project said bumper forwardly; a cross-bar supported above said bumper; a rack bar pivotally connected with said cross-bar and coöperating with a bearing on said frame for permitting backward movement of the cross-bar and preventing forward movement thereof; flexible fabric connected with said bumper and said cross-bar and adapted to be projected forwardly therewith; and releasable means for holding said bumper in retracted position against the action of said springs, said holding means being adapted to be released for permitting the projection of the bumper upon backward movement of said cross-bar, substantially as described.

7. A device of the class described comprising a laterally disposed bumper, the front face of which being provided with a pad or cushion; a strip of canvas surrounding said tube and said bumper; springs tending to project said bumper forwardly; flexible fabric connected with said bumper and adapted to be projected forwardly therewith; and releasable means for holding said bumper in retracted position against the action of said springs, said means being adapted to permit the projection of the bumper when backward pressure is applied thereto, substantially as described.

8. A device of the class described comprising a laterally disposed bumper, the front face of which being provided with a pad or cushion; a strip of canvas surrounding said tube and said bumper; springs tending to project said bumper forwardly; flexible fabric connected with said bumper and adapted to be projected forwardly therewith; and releasable means for holding said bumper in retracted position against the action of said springs, said means being adapted to permit the projection of the bumper when backward pressure is applied thereto, substantially as described.

9. A device of the class described comprising a pair of longitudinally extending tubular bars at opposite sides of an automobile; other bars slidably mounted in said tubular bars; springs tending to project said second named bars from said tubular bars; a bumper mounted on the forward ends of said second named bars; flexible fabric connected with said bumper and adapted to be projected forwardly therewith; and releasable means for holding said bumper in retracted position against the action of said springs, said means being adapted to permit the projection of the bumper when backward pressure is applied thereto, substantially as described.

10. A device of the class described comprising a laterally extending channel bar; a bumper extending across in front of said channel bar; springs tending to project said bumper forwardly from said channel bar; flexible fabric connected with said bumper and adapted to be projected forwardly therewith, said fabric being adapted to be folded up within said channel bar when the bumper is in retracted position; and releasable means for holding said bumper in retracted position against the action of said springs, said means being adapted to permit the projection of the bumper when backward pressure is applied thereto, substantially as described.

11. A device of the class described comprising a laterally disposed bumper; springs tending to project said bumper forwardly; flexible fabric connected with said bumper and adapted to be projected forwardly therewith; releasable means adapted to hold said bumper in retracted position but adapted to be actuated by backward pressure thereon for releasing the bumper; and other releasable means for holding said bumper independently against forward movement, substantially as described.

12. A device of the class described comprising a laterally disposed bumper mounted on the forward end of an automobile; springs tending to project said bumper forwardly; a cross-bar supported above said bumper; flexible fabric connected with said bumper and said cross-bar and adapted to be projected forwardly therewith; an exposed trigger for holding said bumper in retracted position against the action of said springs and adapted, upon backward movement, to release said bumper for projection by said springs; a downwardly extending finger on said bumper; and means actuated by said finger upon forward movement of the bumper for applying a forward pull on the lower end of said trigger, substantially as described.

13. A device of the class described comprising a laterally extending bar; a bumper extending across in front of said bar; springs tending to project said bumper forwardly from said bar; flexible fabric connected with said bumper and adapted to be projected forwardly therewith; an exposed trigger for holding said bumper in retracted position against the action of said springs and adapted, upon backward movement, to release said bumper for projection by said springs; a downwardly extending finger on said bumper; a horizontally swinging arm on said bar in the path of said finger as it moves forward with said bumper; and operative connections between said arm and said trigger adapted to apply a forward pull on said trigger upon the forward movement of said bumper, substantially as described.

14. A device of the class described comprising a laterally extending bar; a bumper extending across in front of said bar; springs tending to project said bumper forwardly from said bar; flexible fabric connected with said bumper and adapted to be projected forwardly therewith; an exposed trigger for holding said bumper in retracted position against the action of said springs and adapted, upon backward movement, to release said bumper for projection by said springs; a downwardly extending finger on said bumper; a horizontally swinging arm on said bar in the path of said finger as it moves forward with said bumper; and a chain connected with said arm and having operative connection with said trigger adapted to apply a forward pull on said trigger upon the forward movement of said bumper, substantially as described.

15. A device of the class described comprising a flexible apron; springs tending to project said apron forwardly; an upwardly extending trigger serving to hold said apron releasably in collapsible condition; a cross bar carried by said trigger for automatically releasing said trigger by backward pressure thereon; and means for locking said apron in collapsed condition against the action of said springs when the said apron is released by said trigger, substantially as described.

In testimony whereof I have signed my name to this specification in the presence of two subscribing witnesses.

WILLIAM MEYER.

Witnesses:
JOSHUA R. H. POTTS,
B. G. RICHARDS.